(12) United States Patent
Beckwith

(10) Patent No.: US 6,766,143 B1
(45) Date of Patent: Jul. 20, 2004

(54) EXPANDED CAPABILITIES FOR WIRELESS TWO-WAY PACKET COMMUNICATIONS FOR INTELLIGENT ELECTRONIC DEVICES (IEDS)

(76) Inventor: Robert W. Beckwith, 2794 Camden Rd., Clearwater, FL (US) 33759-1007

( * ) Notice: Subject to any disclaimer, the term of this patent is extended or adjusted under 35 U.S.C. 154(b) by 0 days.

(21) Appl. No.: 09/479,650

(22) Filed: Jan. 8, 2000

Related U.S. Application Data
(60) Provisional application No. 60/116,984, filed on Jan. 25, 1999.

(51) Int. Cl.[7] .......................... H04B 7/00; H02H 7/04; G05D 3/12
(52) U.S. Cl. .......................... 455/66.1; 455/8; 455/9; 361/35; 361/66; 700/292; 343/784
(58) Field of Search .......................... 455/426.1, 426.2, 455/517, 66.1, 67.11, 8, 9, 423, 424; 361/64, 66, 68, 69, 35; 700/298, 297, 286, 292; 343/761, 781 R, 781 P, 784

(56) References Cited
U.S. PATENT DOCUMENTS

| | | | | |
|---|---|---|---|---|
| 5,517,423 | A | * 5/1996 | Pomatto | 700/286 |
| 5,583,793 | A | * 12/1996 | Gray et al. | 709/223 |
| 5,608,646 | A | * 3/1997 | Pomatto | 700/286 |
| 5,694,329 | A | * 12/1997 | Pomatto | 700/286 |
| 5,818,725 | A | * 10/1998 | McNamara et al. | 700/286 |
| 5,892,758 | A | * 4/1999 | Argyroudis | 340/870.02 |
| 6,005,759 | A | * 12/1999 | Hart et al. | 361/66 |
| 6,535,797 | B1 | * 3/2003 | Bowles et al. | 700/286 |
| 2002/0090001 | A1 | * 7/2002 | Beckwith | 370/466 |

FOREIGN PATENT DOCUMENTS
JP 10-107673 * 4/1998 .......... H04B/1/38

OTHER PUBLICATIONS

Reference 1 in application: Intersil Application Note AN9804.1 by Jim Zyren and Al Petrick, 8 pages, dated Jun. 1998, published on web site http://www.intersil.com.

Reference 2 in application : Intersil Application Note AN9829 by Jim Zyren and Al Petrick, 7 pages, dated Feb. 1999, published on web site http://www.intersil.com.

Reference 3 in application: Intercil PRISM II—11 MBPS descriptive bulletin, no author, 3 pages, dated Oct. 27, 1999, published on web site http://www.intersil.com/data/br/br–065/11mbps.asp.

Reference 4 in application: Advance Product Information: SXT810 Spread Spectrum Digital Cordless Telephone Transceiver, no author, 4 pages, no date, published by Level One Communications, Inc. San Francisco, CA.

Reference 5 in application: "A Single–Chip CMOS Direct–Conversion Transceiver for 900–MHz Spread–Spectrum Digital Cordless Phones", 12 pages, by Thomas Cho . . . Shahriar Rabi, no date, published by Level One Communications, Inc., San Francisco, CA.

Reference 6 in application: GINA 5000N/5000NV transceiver test device for 902 to 928 MHz, no author, 2 pages, dated May 19, 1999, from web site http://www.greamerica.com/5000n.html.

(List continued on next page.)

Primary Examiner—Marsha D. Banks-Harold
Assistant Examiner—Rafael Perez-Gutierrez
(74) Attorney, Agent, or Firm—Led J. Aubel

(57) ABSTRACT

In an independent basic service set (IBSS) of IEDs, using wireless communications devices to provide license-free two-way wireless peer to peer communications of digital data between pairs of IEDs, and also to provide wireless peer to peer communications between ones of said IEDs and a common access port to the IBSS.

7 Claims, 12 Drawing Sheets

OTHER PUBLICATIONS

Reference 7 in application: GINA 7000N/7000NV transceiver test device for 2.404–2.478 GHz, no author, 2 pages, dated May 19, 1999, from web site http://www.greamerica.com/7000n.html.

Radio Test at Gateway Substation by Drew Craig, 3 pages, dated Jun. 15, 1999, a Beckwith Electric Company report.

Reference 8 in application: M–2667, 2 sheets, Controls Product Specification, no author, dated 10/99. Beckwith Electric Company publication #800–2667–SP–04.

Reference 9 in application: M–2601(M–2655), M–2602(M–2671), M–2603(M–2693) Preliminary Controls Product Specification, 2 sheets, no author, dated Apr. 8, 1999.

Beckwith Electric Company publication 800–2670–SP–01. M–2501A Controls Specification, 2 sheets, no author, dated 8/98. A Beckwith Electric Company publication 800A–2501A–SP–03.

Reference 10 in application: A wireless communications card for use in PCMCIA slots. This is AirCard 300, no author, Nov. 1999, published in US Airways Attache magazines distributed at passenger seats on US Airways flights.

Reference 11 in application: U. S. Pat. 5,943,202, Two Way Packet Radio Including Smart Data Buffer and Packet Rate Conversion, 5 sheets, by RWB, issued Aug. 24, 1999.

Reference 13 in application: U. S. Pat. 5,646,512, Multifunction Adaptive Controls for Tapswitches and Capacitors by RWB, issued Aug. 8, 1997.

Reference 14: U. S. Pat. 5,530,338, Load Tapchanger Transformer Paralleling by Daisy Chain Comparison of Load Currents, by RWB, issued Jun. 25, 1996.

Goal 2020, Keeping Current, an article by Bob Beckwith starting on the first page of Powerlines, a Beckwith Electric Company newspaper published in Mar., 1995.

Patent application serial 08/421,378 A Radial Digital System Using a Smart Hub for Rapid By–Directional Communication filed Apr. 13, 1995. This application was abandoned and an application filed resulting in issuance of Patent 5,943,202 Reference 11 above. Note in particular the reference to peer–to–peer communications in the first full paragraph of p. 15.

Final office action application 08/421/378, above.

Load Tapchanger Transformer Paralleling by Radio Comparison of Load Current Phases, a draft of a Provisional Patent Application, 5 pages plus one Figure, by RWB, dated Sep. 14, 1995. For reasons unknown this was never filed. Note in particular the peer–to–peer communications described in the first full paragraph of p. 2.

* cited by examiner

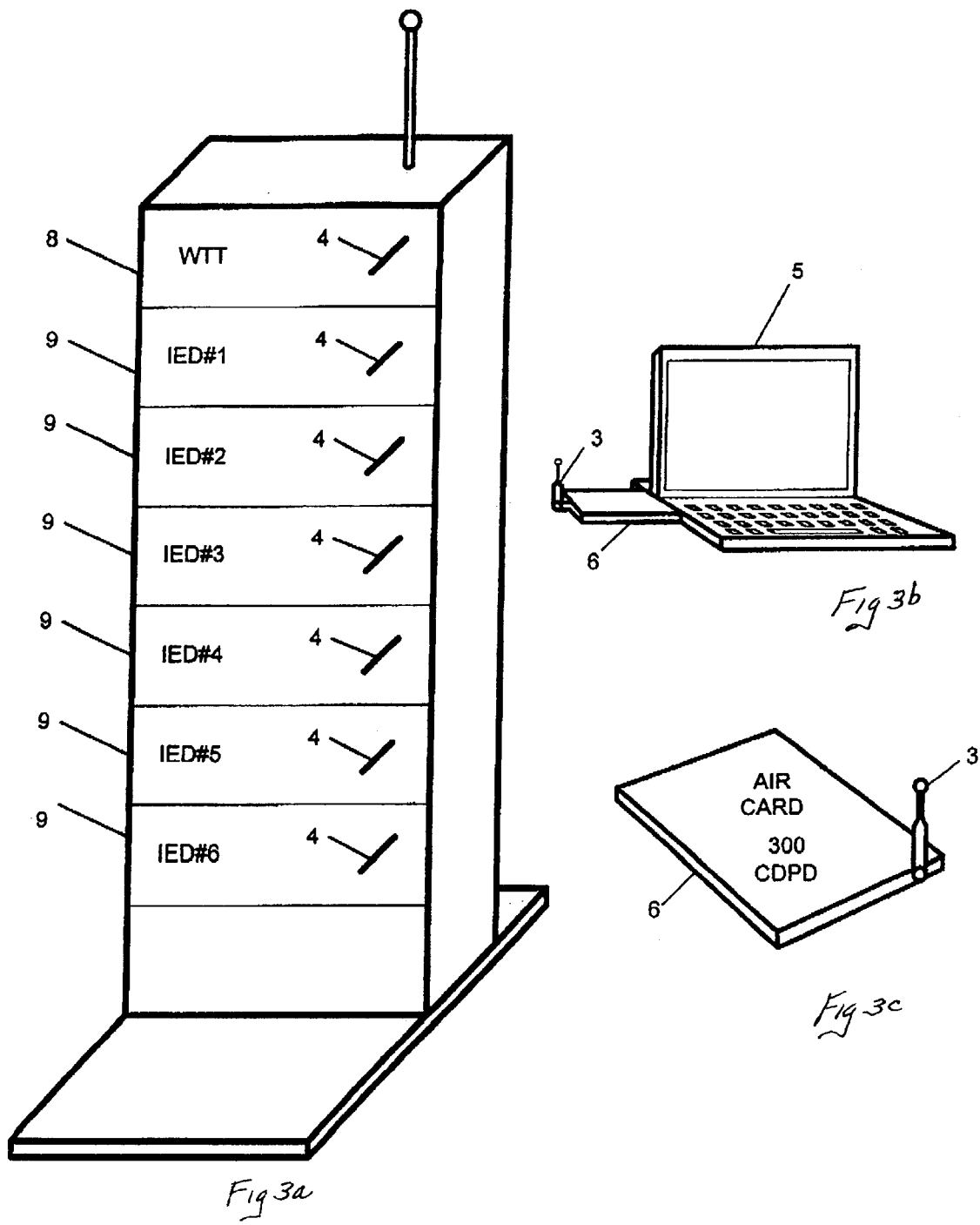

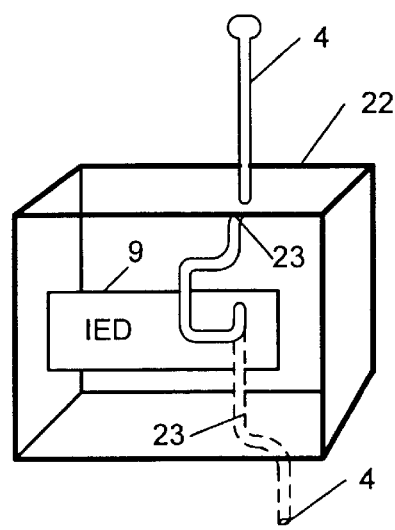
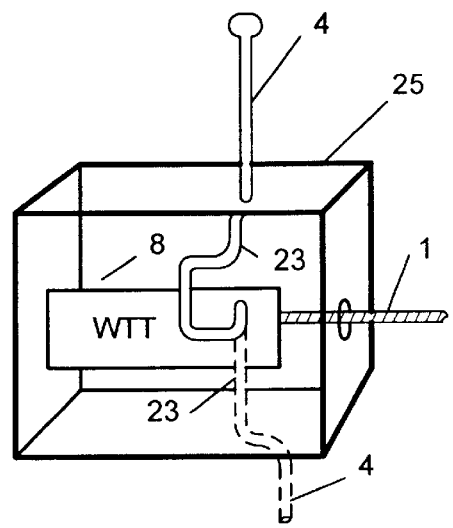
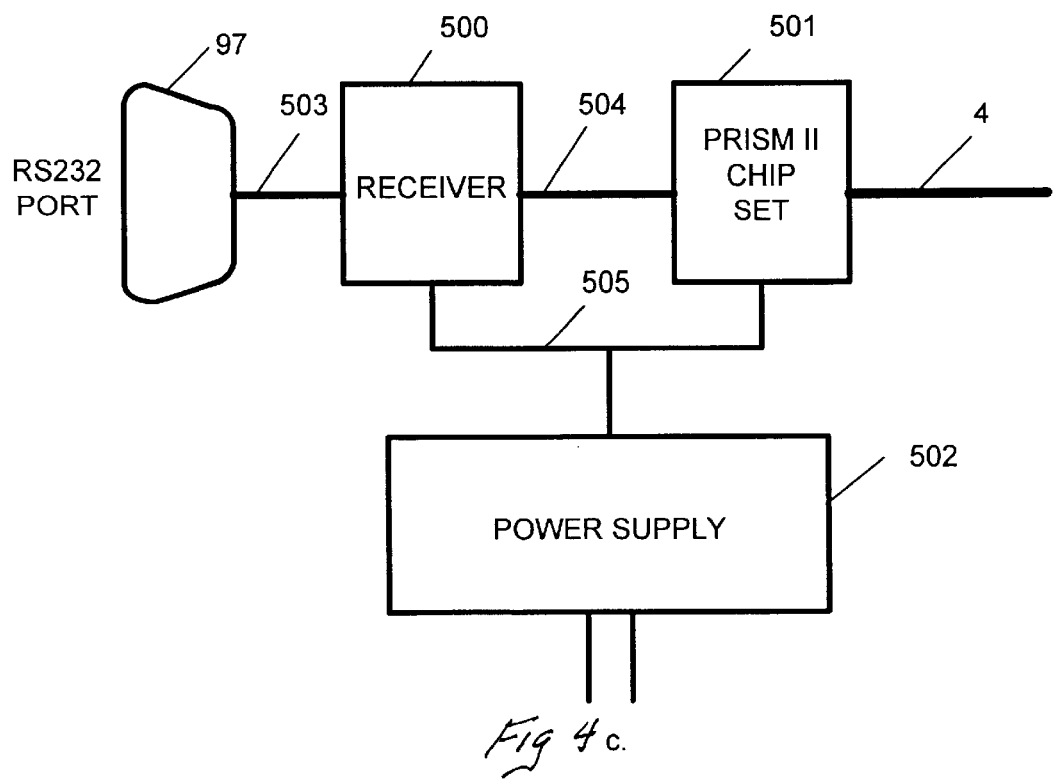

EXPANDED CAPABILITIES FOR WIRELESS TWO-WAY PACKET COMMUNICATIONS FOR INTELLIGENT ELECTRONIC DEVICES (IEDS)

This application claims the priority date of provisional patent application Ser. No. 60/116,984 filed on Jan. 25, 1999 titled "RADIO AS THE MAN/MACHINE INTERFACE FOR AN IED".

BACKGROUND OF THE INVENTION

Prior Art: Wireless Chip Sets

Note that the term "wireless" is generally used hereinbelow in place of the term "radio" as being more descriptive of the related technology.

Use of wireless frequencies and communications methods which do not require individual device licensing is preferred. The following is taken from Reference 1 hereinbelow; Intersil Application Note AN9804.1 by Jim Zyren and Al Petrick, dated June 1998:

Spread Spectrum Radios

The term "spread spectrum" simply means that the energy radiated by the transmitter is spread out over a wider amount of the RF spectrum than would otherwise be used. By spreading out the energy, it is far less likely that two users sharing the same spectrum will interfere with each other. This is an important consideration in an unlicensed band, which is why the regulatory authorities imposed spread spectrum requirements on radios which transmit over −1 dBm (about 0.75 mW).

The frequency allocation by countries is found in Reference 2 hereinbelow; Intersil Application Note AN9829 by Jim Zyren and Al Petrick:

| | |
|---|---|
| U.S. | 2.4000–2.4835 GHz |
| Europe | 2.4000–2.4835 GHz |
| Japan | 2.4710–2.4970 GHz |
| France | 2.4465–2.4835 GHz |
| Spain | 2.4450–2.4750 GHz |

Again from Reference 1:

In the U.S., license-free bands are collectively designated as Industry, Science, and Medicine (ISM) bands. Operation in these bands with approved devices does not require an FCC license. By waving licensing requirements, these bands have been made generally accessible to virtually everyone. This is mainly why ISM bands are so important for commercial and consumer applications.

As mentioned above, radios employing spread spectrum methods are allowed to radiate up to 1.0W (30 dBm) of RF energy, as compared to less than 1 mW for non-spread radios. There are two common types of spread spectrum systems. The easiest to understand is Frequency Hopped Spread Spectrum (FHSS). In this method, the carrier frequency hops from channel to channel in some pre-arranged sequence. The receiver is programmed to hop in sequence with the transmitter. If one channel is jammed, the data is simply retransmitted when the transmitter hops to a clear channel. The major drawback to FHSS is limited data rate. In the 2.4 GHz band, FCC regulations require that the maximum occupied bandwidth for any single channel is 1 MHz. This effectively limits the data rate through this type of system to about 1 Mbps.

By contrast, Direct-Sequence-Spread-Spectrum (DSSS) systems in the ISM bands provide much higher data rates. DSSS systems do not jump from frequency to frequency. Instead, the transmitter actually spreads the energy out over a wide portion of the RF spectrum. This is accomplished by combining the data stream with a much higher rate Pseudo Random Numerical (PRN) sequence via an exclusive "or" (XOR) function. The result is a digital stream at the same rate as the PRN. When the RF carrier is modulated by the higher speed digital stream, the result is a spreading of the RF energy . . . . At the receiver, the pseudo random code is used to "de-spread" the received data . . . . It is during this process that the matched filter rejects unwanted interference because it is uncorrelated with the PRN. By careful selection of the PRN sequence, the matched filter provides an additional benefit. It can reject multipath signals which are delayed relative to the main signal . . . by 44 ns (or more).

At this time of writing Intersil has introduced their PRISM II-11 Mbps (Mega bits per second) chip set using DSSS technology supporting IEEE Standard 802.11 2.4 GHz Wireless Local Area Networks (WLANs). Moreover this chip set also supports peer-to-peer ad hoc networks.

The following partial specifications are published by the Intersil website:

Variable data rates: 11, 5.5, 2, 1 Mbps
Frequency band: 2.4 GHz ISM Band
Dual modes: 1—WLAN, and 2—Independent Basic Service Sets (IBSSs) consisting of two or more stations (IEDs) which have recognized each other and have established communications. Within an IBSS, stations communicate directly with each other on a peer-to-peer level. Selectively, groups of IBSSs then are combined through a distribution system to an Access Port (AP) to communicate with wired LANs.

Again the following is selectively quoted from Intersil tutorial AN9829 dated February 1999 by Jim Zyren and Al Petrick, reference 2 below, on IEEE standard 802.11 which the PRISM II chip set supports:

DSSS is the same technology used in GPS satellite navigation systems and in CDMA (Code Division Multiple Access) cellular telephones . . . the data stream is combined via an XOR function with a high-speed PRN sequence using an 11 chip Barker Code. The term "chip" (note: not to be confused with a chip set of components) is used instead of "bit" to denote the fact that the Barker Code does not carry any binary information by and of itself. The result is an 11 Mbps digital stream which is then modulated onto a carrier frequency using Differential Binary Phase Shift Keying (DBPSK).

WLAN radios are half duplex and cannot receive while transmitting. Therefore a collision cannot be detected by a radio while transmission is in progress. The basic access method for 802.11 is the Distributed Coordination Function (DCF) which uses Carrier Sense Multiple Access/Collision Avoidance (CSMA/CA). Stations (STAs/IEDs) sense the medium to determine if it is idle. If not each STA waits until transmission stops, and then enters into a random back-off procedure. This reduces the probability of data clashes. Packet reception in DCF requires acknowledgement (ACK) . . . The period between completion of packet transmission and start of the ACK frame is one Short Inter Frame Space (SIFS).

Fast acknowledgement is one of the salient features of the 801.11 standard, because it requires ACKs to be handled at the Multiple Access Communications (MAC) sub-layer. Transmissions other than ACKs must wait at least a DCF inter-frame space (DIFS) before transmitting data . . . STAs wishing to transmit must wait an integer number of Slot Times depending on an internal timer setting (0 to 7 on first attempt). Upon expiration of a DIFS, the timer begins to decrement and on reaching zero the STA begins transmission. If a collision is detected the window is increased to 15 Slot Times and doubled after each unsuccessful attempt up to a maximum value of 256 Slot Times.

This method relies on the ability of each STA to sense all others . . . . If not the probability of collision is greatly increased. This is known as the Hidden Node. In order to combat this problem, a second carrier sense mechanism, Virtual Carrier Sense is described in the standard. Virtual Carrier Sense is implemented by reserving the medium for a specified period of time for an impending transmission.

The standard, supported by PRISM II, provides for security by two methods: authentication and encryption. It further supports synchronization of STA clocks by periodic transmissions of beacons containing time stamp information. It further supports power management by defining awake and doze modes of operation.

In addition . . . a waveform supporting 20 to 30 Mbps is under development. A task force is drafting a standard based on Orthogonal Frequency Division Multiplexing for implementation of these higher data rates.

A SXT810 chip by Level One, as given by References 4 and 5 hereinbelow, appears to have the advantage of being a single chip however, being designed for use in cordless telephones, it has the disadvantage of a limitation to approximately a 40 KHz data rate and non-compliance with IEEE standard 810.11.

The chip sets described hereinabove are typical of those at the time of writing. Additional chip sets and single chip devices are expected to become available. It is to be understood that the invention contained herein is not limited to the chip sets described herein.

Prior Art: The Electric Power Industry

Electric power distribution substations supply approximately 80% of the power in the U. S. A. directly over distribution lines and cables feeding many homes and businesses. The remaining 20% consist of large entities, such as industries and shopping malls, that are supplied by individual connections to electric power transmission or sub-transmission lines.

Intelligent Electronic Devices (IEDs) generally consist of control IEDs for LTC transformers and regulators for the control of voltage as well as protective relay IEDs for operation of devices such as circuit breakers for the interruption of fault currents; the operation commonly being known as "clearing a fault". The term "intelligent electronic devices" is commonly used throughout the electric power industry as the name for control and protection devices and is so used herein. Alternatively the abbreviated term "IED" is used to refer to such devices.

Since the writing of the patent application which resulted in issuance of U.S. Pat. No. 5,943,202 (see Reference 11 hereinbelow), some electric power substation control has been established wherein information has been obtained from unattended stations and fed to central locations by Supervisory Control And Data Acquisition (SCADA) systems. At these central locations, combinations of operators and central computers function together for operation of substations.

In practice the term "protocol" has been extended to include not only the methods of data communications but also the list of data points communicated. Standardization of protocols thereby forces industry agreement on the choice of these data points. This results in a "look alike" nature of competitive IEDs and tends to discourage inventive automation at the substation level.

The deregulation of the electric power industry and implementation of competitive sale of electric power has resulted in downsizing of utility personnel by the elimination of work positions and by the early retirement of experienced personnel with substitution of inexperienced personnel. In many utilities there simply are not the personnel available, experienced of otherwise, to process the vast amount of data provided them by SCADA systems.

Centralization of distribution substation operation brings about the following problems:

1) The labor intensive task of keeping computerized central control systems updated as to changes, such as in distribution line configurations and customer connections to the lines.

2) The labor intensive need for human estimation of load changes due to factors such as rapidly changing weather conditions and the effect of week ends, holidays and industry strikes on peoples working hours and their uses of electricity.

3) The continuing high costs of IED design changes, by manufacturers of IEDs, caused by the lack of agreement and standardization among the owners of substations as to the protocols used for SCADA communications.

4) The stifling of competition brought about by standardization of protocols.

5) The inability of personnel to handle the work load of centralized substation operation.

Load Tapchanging (LTC) transformers are used at power system substations to feed electrical loads (loads). Multiple transformers are sometimes used and these multiple transformers are sometimes used in combinations of parallel and independent operation. In parallel operation outgoing power lines are tied together with circuit breakers (tie breakers) to place loads on transformers operating in parallel. In independent operation, each such transformer carries loads independently of other transformers. In general all possible combinations of parallel and independent operation are found. The combinations vary from installation to installation and at any one installation may vary with time and load conditions.

Prior art paralleling schemes generally fall into two classes of schemes. The first is the master-follower scheme. In this scheme, one transformer acts as the master in responding first for a need to raise or lower one LTC tap position in controlling output voltages. When the need for a tapchange in the same direction occurs, other transformers follow the master and make tapchanges.

One second scheme uses communications by wire and equipment between transformers whereby the circulating VArs, caused by paralleled transformers when not on the same tap position, is minimized by use of paralleling devices. Another second scheme is described in U.S. Pat. No. 5,530,338, referenced hereinbelow by Robert W. Beckwith, one of the inventors herein. In this scheme the number of interconnecting wires is reduced to one wire per pair of paralleled transformers in daisy-chain fashion around a ring with no additional equipment required.

Tap switch position is available by using equipment added to LTC transformers. Alternative LTC control IEDs may keep track of tap positions using methods of U.S. Pat. No. 5,646,512 (see Reference 13 hereinbelow) by Robert W. Beckwith, one of the inventors herein.

Equipment capable of "hands off" automation has been developed by the Beckwith Electric Co. Inc. and is termed the "Autodaptive™ volt/Var management system". This utilizes inventions from U.S. Pat. No. 5,646,512, which the products follow rather closely.

The Beckwith Electric M-2667 control for LTC transformers regulates the voltage out of distribution substations as a part of the Autodaptive™ system. This control is designed to provide lowest cost and highest performance. The control is capable of communicating 20 times per second in packets requiring 8 ms or less in time during otherwise unused half cycles of the power frequency.

The M-2667 control provides a vast amount of data as to its performance which is valuable in analyzing the need for maintenance. This is far beyond the amount of data space provided by standardized protocols, therefore the incentive to circumvent the protocol problem by use of the inventive wireless communications system of reference U.S. Pat. No. 5,943,202.

FIG. 7a illustrates a circuit for a prior art optically coupled RS232 port used to protect IED communications from high voltages that may exist between points within a substation during ground faults within the station. Various standards call for RS232 port withstand voltages of 1500, 2000 and 2500 Vac.

The Beckwith Electric Co. M-2600 line of controls, (IEDs), also include tapchanger controls for single phase regulators. Regulators are specialized autotransformers that change voltages +/-10% by means of 16 raise, 16 lower and a neutral tap position and are generally used on power distribution lines. Regulators have a voltage control bandwidth that are typically set at three volts. The most common application of regulators is in sets of three to control voltages on three phase lines. In normal operation, at times one regulator of the set may be at the low end of the band and another at the high end sometimes resulting in a three volt unbalance in phase voltages. While this much unbalance may not be damaging to three phase motors supplied by the distribution lines, undesirable power losses may result. Phase unbalance currents resulting from voltage unbalance can be analytically divided into positive, negative and zero sequence currents. Only the positive sequence currents contribute to the operation of three phase motors. The negative and zero sequence currents result in increased power losses in distribution lines, power transformers and in the motors themselves. Whenever a large number of motors is involved, costs of these power losses may be significant.

FIG. 4 of reference U.S. Pat. No. 5,943,202 shows three regulators sharing the use of a single radio for communications. This assumed that it was less costly to use two coaxial cables to save the cost of two additional radios. While this was likely correct at the time of writing reference U.S. Pat. No. 5,943,202 it may no longer be true.

REFERENCES

The following references are used in this invention.

1: Intersil Application Note AN9804.1 dated June 1998.
2: Intersil Application Note AN9829 dated February 1999.
3: Intercil PRISM II—11 MBPS descriptive bulletin.
4: "Advance Product information on the SXT810 Spread Spectrum Digital Cordless Telephone Transceiver" from Level One Communications, Inc. a company being purchased by Intel.
5: "A Single-Chip CMOS Direct-Conversion Transceiver for 900-MHz Spread-Spectrum Digital Cordless Phones", a paper from Level One Communications, written by the designers of the SXT810 chip.
6: GINA 5000N/5000NV transceiver test device for 902 to 928 MHz.
7: GINA 7000N/7000NV transceiver test device for 2.404–2.478 GHz.
8: M-2667 sales brochure.
9: M-2601 (M-2665), M-2602 (M-2671), M-2603 (M-2693) sales brochures.
10: A wireless communications card for use in PCMCIA slots.
11: U. S. Pat. No. 5,943,202, TWO WAY PACKET RADIO INCLUDING SMART DATA BUFFER AND PACKET RATE CONVERSION.
12: Provisional patent application Ser. No. 60/116,984.
13: U. S. Pat. No. 5,646,512, MULTIFUNCTION ADAPTIVE CONTROLS FOR TAPSWITCHES AND CAPACITORS.
14: U. S. Pat. No. 5,530,338, LOAD TAPCHANGER TRANSFORMER PARALLELING BY DAISY CHAIN COMPARISON OF LOAD CURRENTS.

SUMMARY OF THE INVENTION

Devices using two-way packet wireless communications in accordance with U. S. Pat. No. 5,943,202, for communications in and out of electric utility substations also use wireless communications as the human interfaces for IEDs by means of hand held computers. This computer then provides the operational keys and display for use with a number of IEDs in a location. Selective wireless communications access of IEDs from wired telephone lines, coaxial cable lines, fiber optic cable lines, wireless land lines, satellite and direct Internet access telephones are included. Wireless IED to IED communications is also provided for direct peer-to-peer exchange of control and protection information within a substation without dependence on single shared apparatus. Selectively peer-to-peer groups are combined through access points accessible from land lines. When applied to sets of three power regulators, peer-to-peer communications can be utilized to reduce three phase voltage unbalance. When applied to paralleled transformers, tap position information is exchanged for paralleling. When applied to controls and protective relays, first line protection is achieved. Back up protection is then achieved by means of communications through access points using equipment common to IEDs.

BRIEF DESCRIPTIONS OF THE DRAWINGS

[1] Pipeline is defined herein as any wireless-communications circuit that can be replaced with a wire without requiring changes in IED communications coding.

FIG. 3a shows a rack mounted assembly of six IEDs and a wireless communications to telephone line translator.

FIG. 3b shows a typical laptop computer with a wireless communications device in a card slot acting as the human interface (HI) for the IEDs in FIG. 3a.

FIG. 3c shows an expanded view of the wireless communications device of FIG. 3b.

FIG. 4a illustrates a typical IED mounted in an outdoor box.

FIG. 4b illustrates a wireless communications transceiver translator mounted in an outdoor box.

FIG. 4c illustrates a block diagram of a circuit used as a wireless communications device for adding wireless communications to an IED with an RS232 port.

Figure 5:
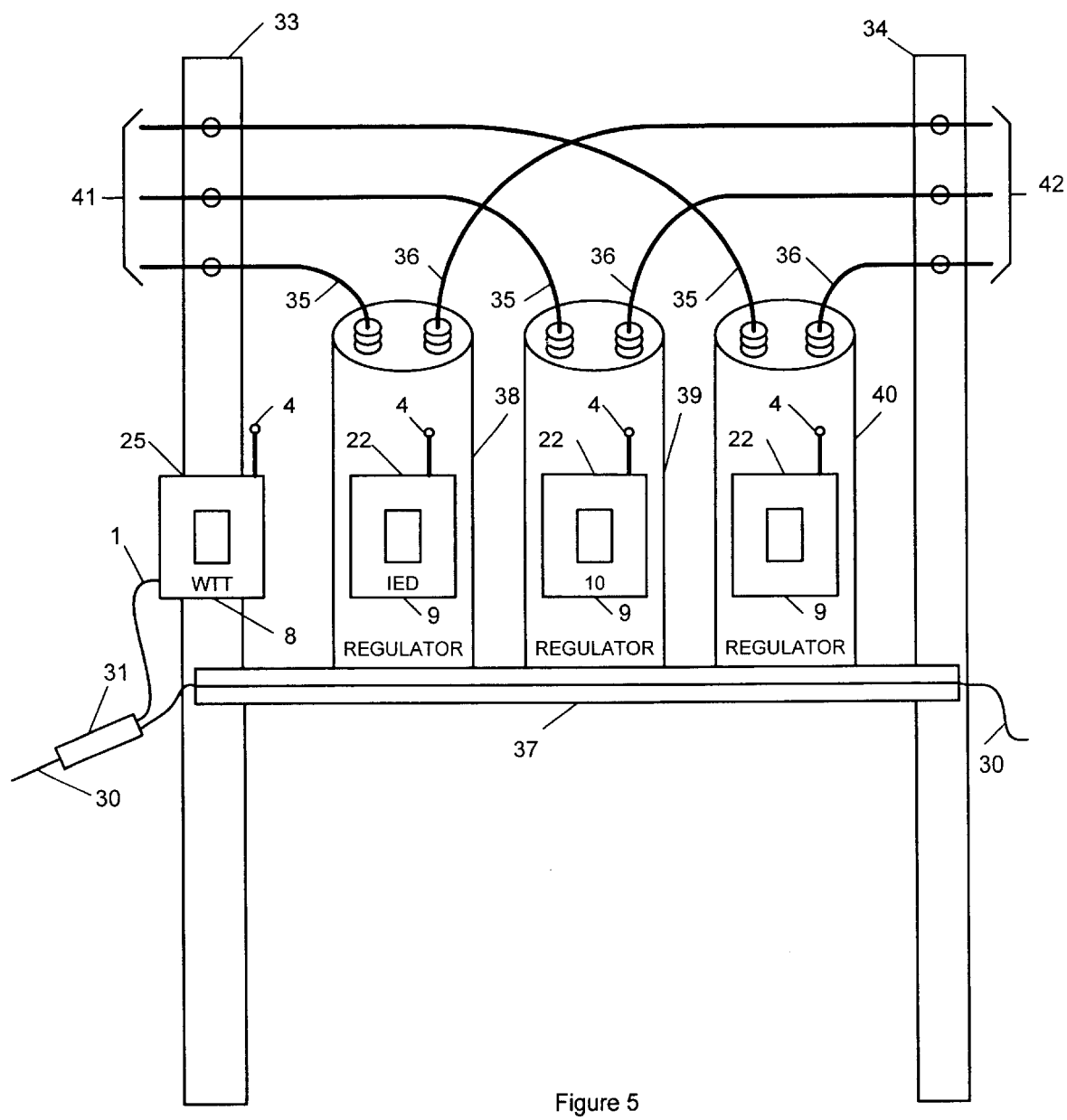

FIG. 5 illustrates three regulators located midway on a three phase distribution line.

Figure 6:
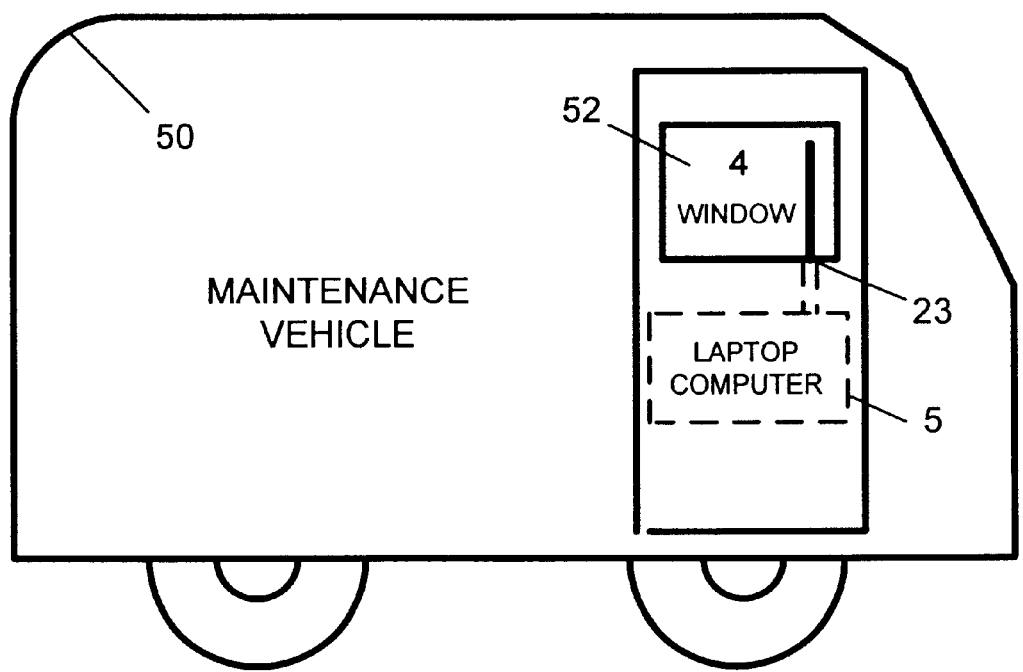

FIG. 6 illustrates a maintenance truck with a laptop computer having a wireless communications antenna on the window for communications with the IEDs of FIG. 5.

Figure 7A:
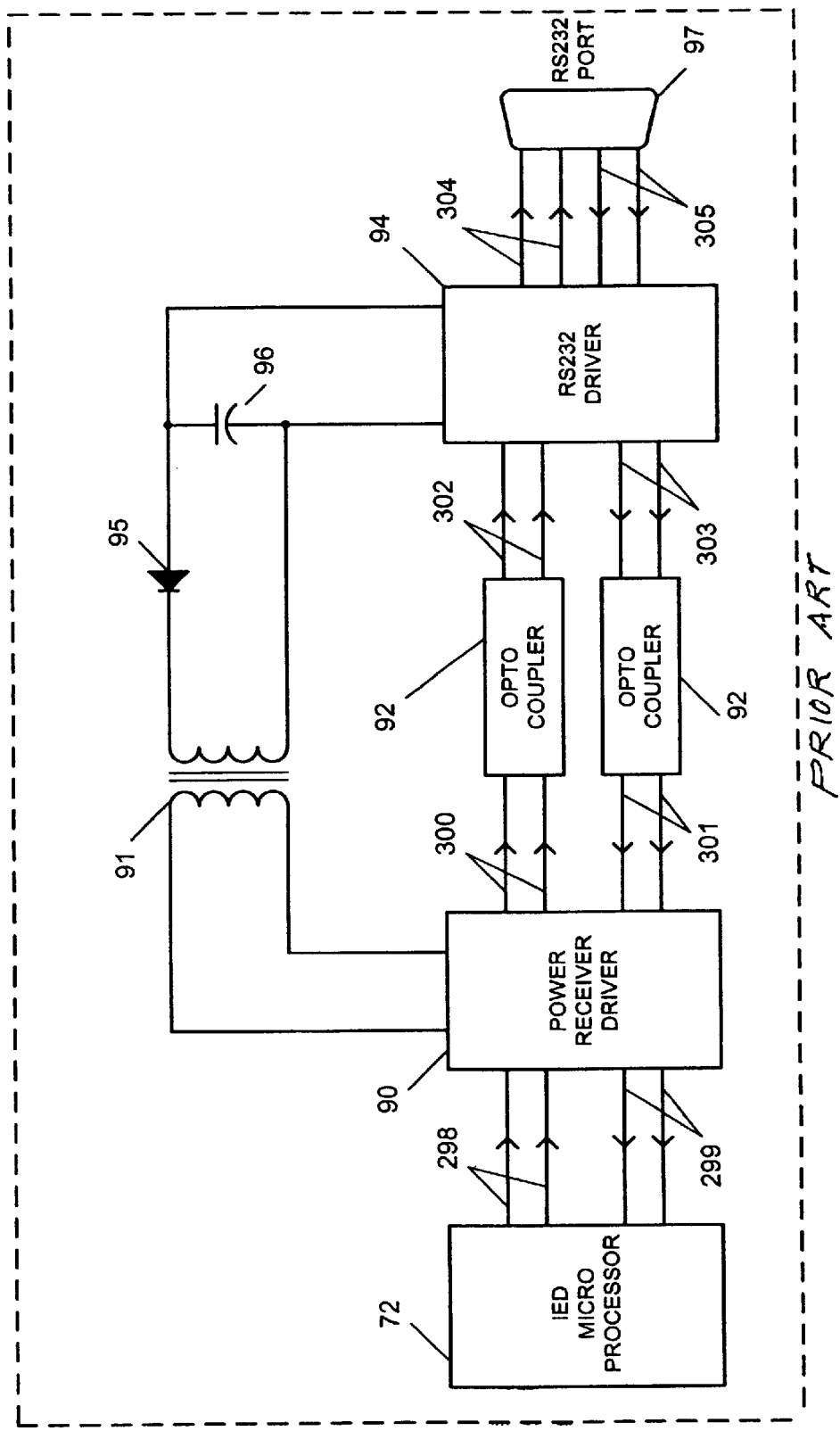

FIG. 7a shows prior art circuitry for optically isolated RS232 ports.

Figure 7B:
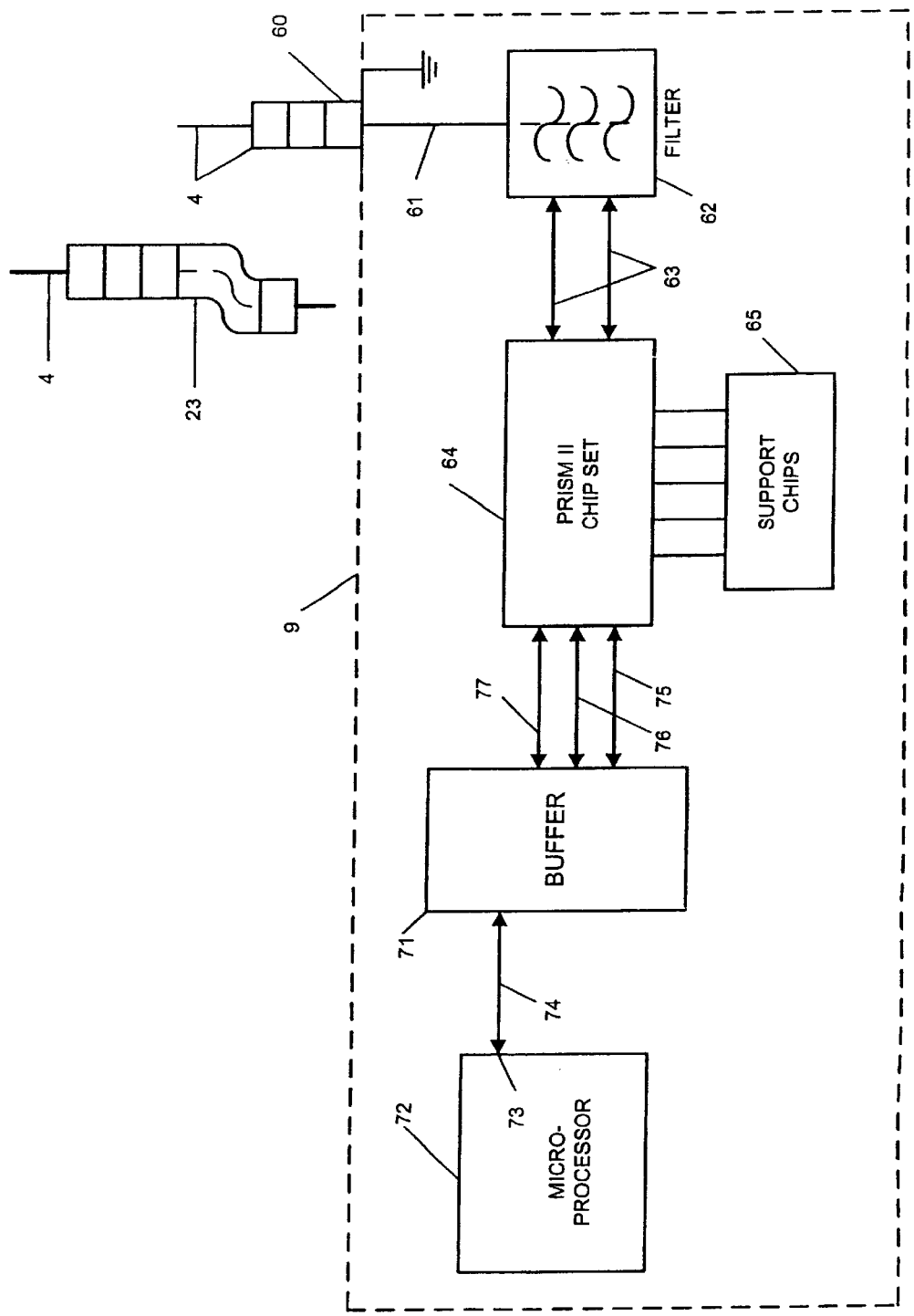

FIG. 7b illustrates a wireless communications circuit which inventively replaces the optically coupled RS232 port of FIG. 7a.

Figure 8:
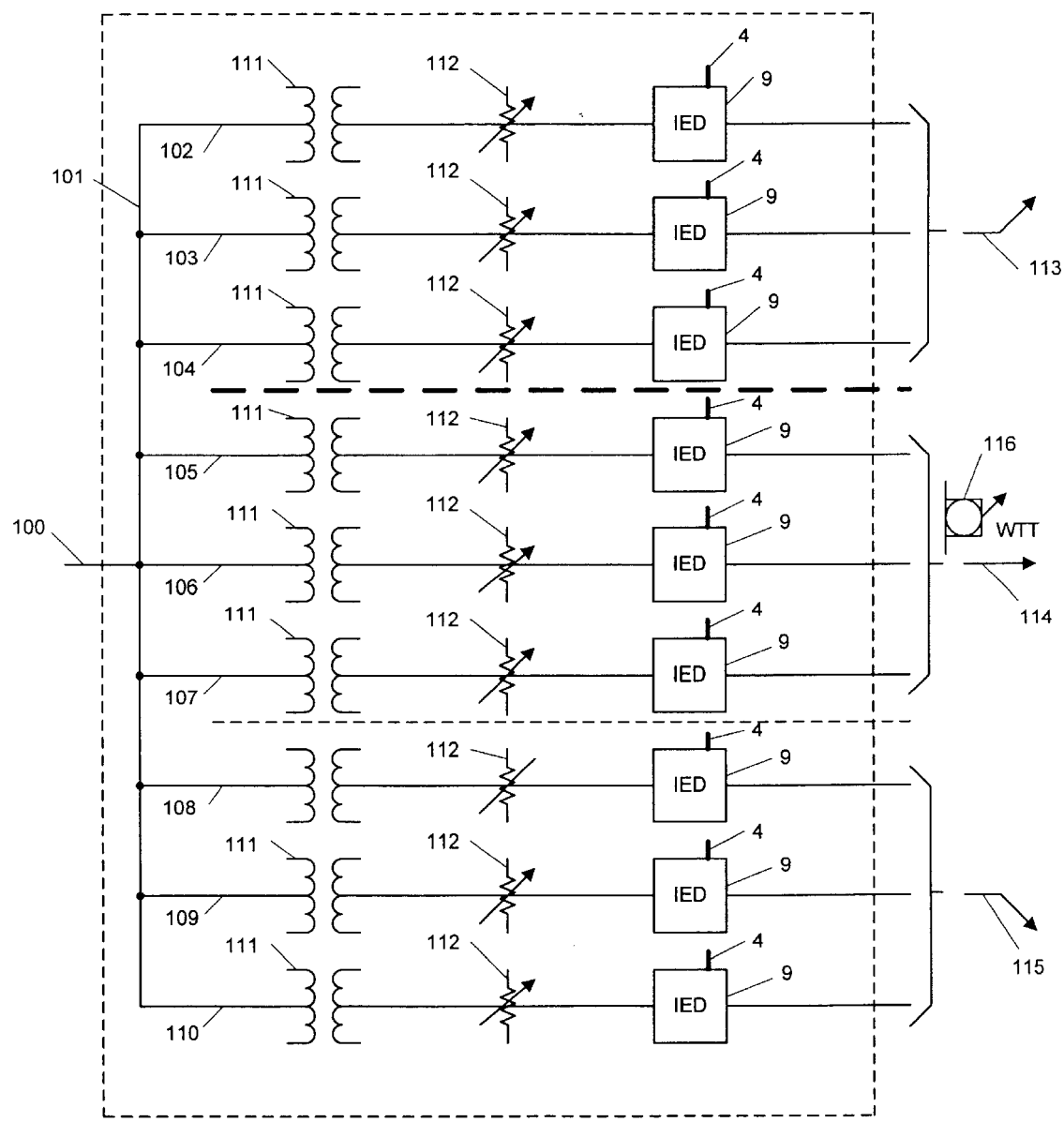

FIG. 8 illustrates a distribution substation supplying loads through regulators with communications via a wireless communications transceiver translator.

Figure 9:
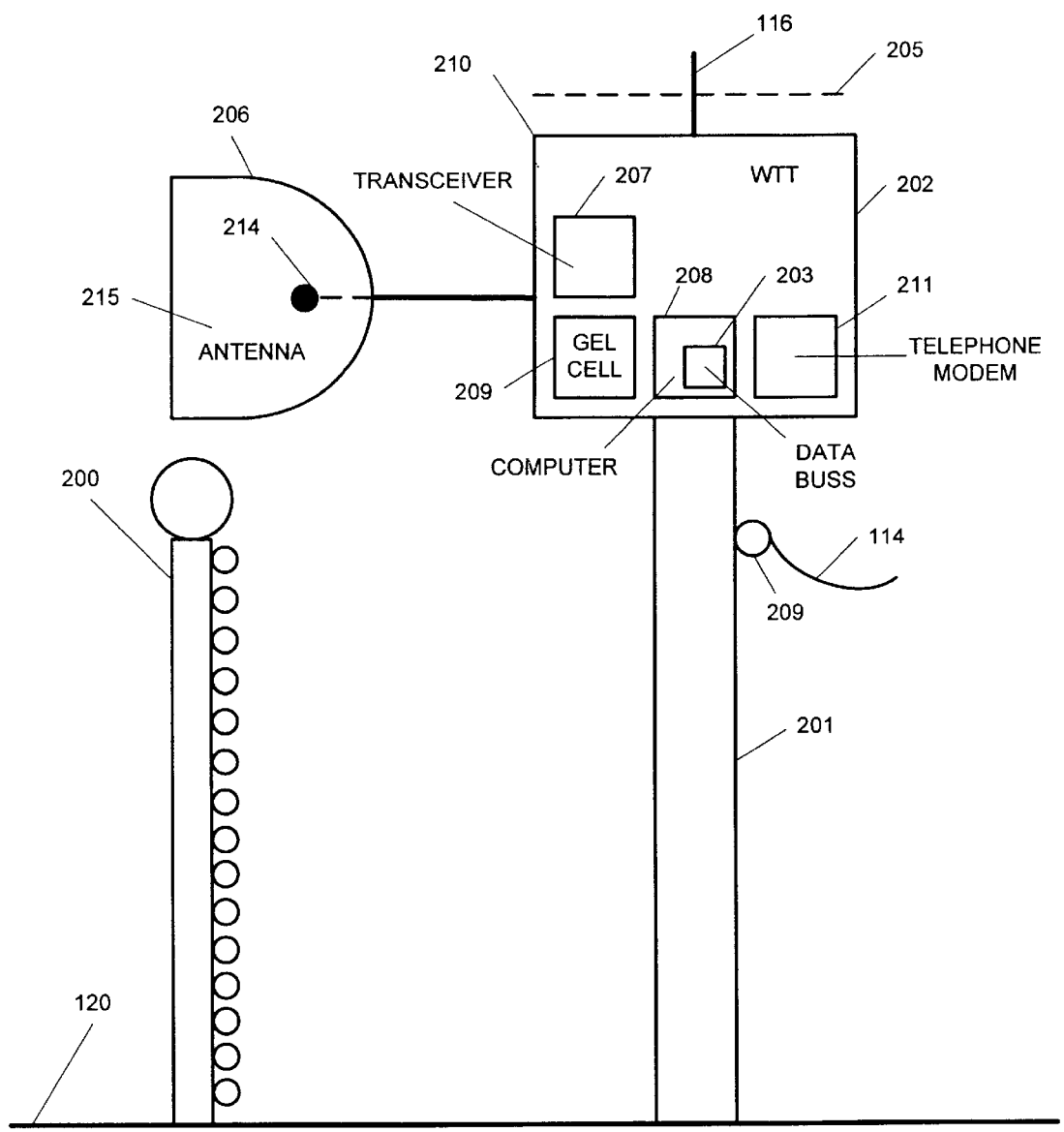

FIG. 9 illustrates a solar powered wireless communications transceiver translator used to communicate between IEDs in a substation and a telephone line.

Figure 10:
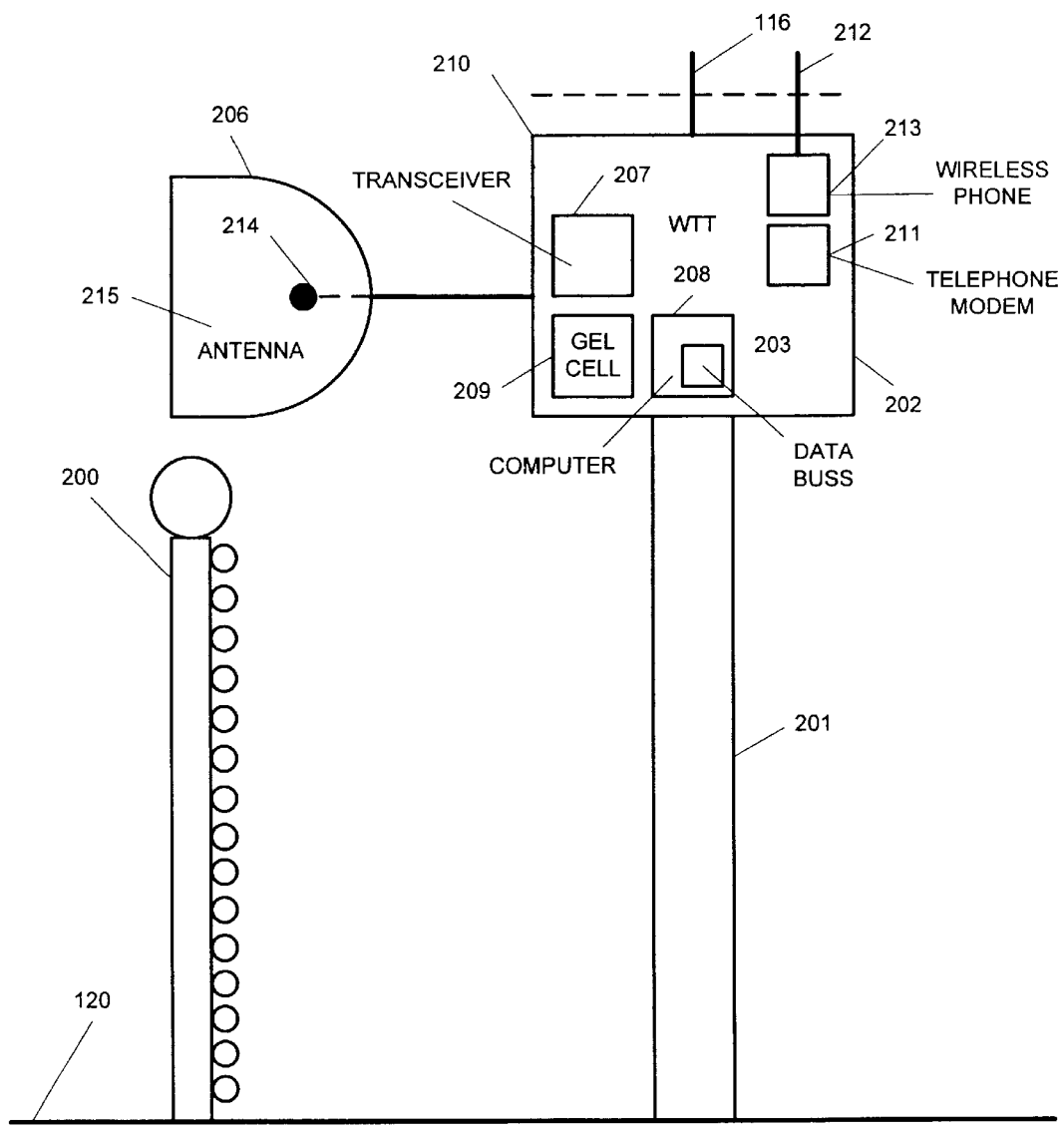

FIG. 10 illustrates a wireless communications transceiver translator similar to that of FIG. 9 but selectively utilizing a wireless phone with Internet access to distribute IED information.

Figures 11A, 11B:
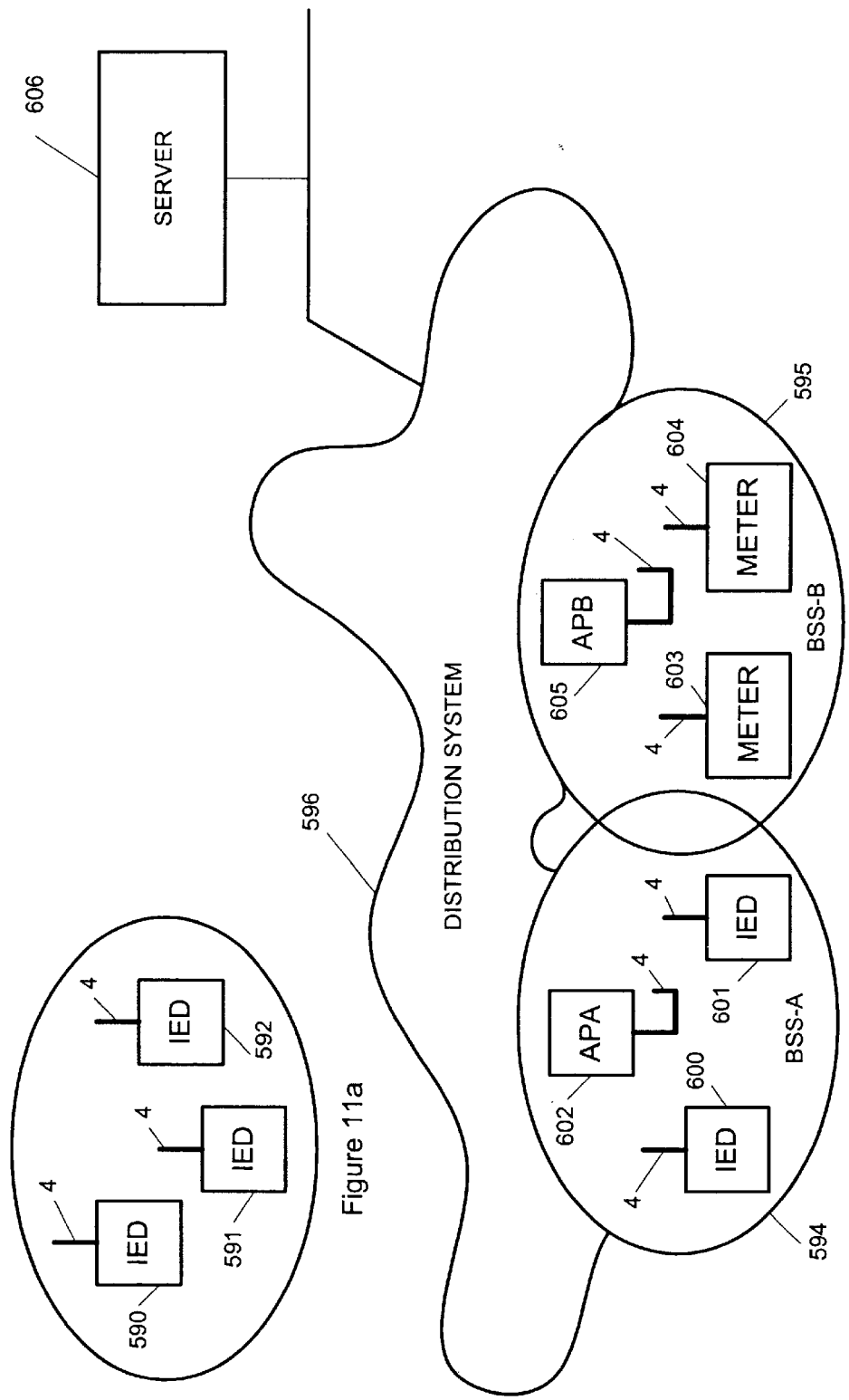

FIG. 11a illustrates an Independent Basic Service Set (IBSS) used to provide wireless peer-to-peer communications between three IEDs.

FIG. 11b illustrates an Extended Service Set (ESS) consisting of two BSSs each containing a Access Point (AP) to a Distribution System (DS) with connection to a server.

DETAILED DESCRIPTION OF THE PREFERRED EMBODIMENTS

Cell phones with suitable modems, and alternatively land telephone lines with suitable modems, have been used for communications with beta site installations of M-2667 IEDs. Alternatively cell phones are used for placing IED information on the Internet for multiple user access.

This patent covers the exchanging of binary data packets by wireless communications from Intelligent Electronic Devices (IEDs) using first time criterion, buffering in Wireless communications Transceiver Translators (WTTs), also known as Access Points (APs), for use at second time criterion. Peer-to-peer wireless digital communications between IEDs is also supported.

Preference is given to the use of Prism II wireless chip sets available from the Intersil division of the Lucent Corporation or succession of that product as the practice of wireless communications and standards related to wireless communications progress with time. Any combination of frequencies, devices and methods which permits communications without individual apparatus licensing will herein be referred to as "license-free" wireless communications. Solutions of compliance with government regulations for license-free communications are thereby made certain by use of the Prism II chip set.

Standardization among suppliers of IED apparatus permits peer-to-peer communications between IEDs of various suppliers as well as combined communications to land line Local Area Networks (LANs). Solution to problems of data collisions, error detection and automatic retransmission, message security, and automatic selection of highest useable data rates are provided by products such as the Prism II chip set.

Individual packets of operational data carry a minimum of overhead required by the wireless communications. From the external viewpoint of carrying out the control and protection functions of IEDs, once communications between pairs of IEDs is made, a pipeline is established for data packets.

Peer-to-peer communications between IEDs in an ad hoc group permits control and protection functions to be carried out at high speed without the system-wide hazard of failure of common hardware. Common devices, such as land-line APs connected to servers, then oversee substation operation. Failures to communicate with specific IEDs are used as indications of IED failure and contingency procedures then used by the server for backup clearing of faults and to prevent run-away operations of controlled equipment. Please see the group C example in the discussion of FIGS. 11a and 11b hereinbelow.

Control and protective relay IEDs are often located together within a building at substations for ease of adjustment and maintenance. Otherwise control IEDs are mounted outdoors on power equipment, such as tapchanging transformers and regulators.

WTTs are mounted in rooms when used to house substation control and protection IEDs. Here simple non-directional rod antennas communicate with wireless communications equipped IEDs in the room. Communications to points outside the substation is made by land telephone lines, by cell phones, by telephones communicating via satellites and by Internet accessing telephones. In the latter case, Internet access varies widely with location and with time as the Internet availability improves. Direct satellite communications is currently meeting limited success. Mounting of outgoing cell phones within the equipment room is generally successful.

When control and protection IEDs are mounted outdoors in metal cabinets it is generally necessary to bring wireless communications antennas from first wireless communications IED devices outside of the cabinets. For cost reasons it is generally undesirable to make these antennas directional.

When IEDs are mounted in locations scattered throughout a substation, use of a single directional antenna at one edge of the substation is desirable. Generally this position will be one side or the other of a substation fence. Location outside the fence has the advantage that a substation key and entrance authority are not required for access of the wireless communications equipment. Inventive directional antennas consist of reflectors having parabolic vertical shapes and straight horizontal shapes. Horizontal antennas are located at the foci of the parabolas. End pieces close the eclipses at both ends and are located even integer number of half wave lengths at the wireless communications frequency apart. In the preferred 2.4 MHz band the width of the reflectors are integer multiples of 2.437 inches. The reflector is preferably 12" high by 24.37" wide. The antennas with reflectors are mounted on the side of cabinets containing equipment providing a selection of communication means to remote locations.

Typical output communication media selections are: cell phones, Internet ready phones, coaxial cables, fiber optic cables, and wire telephone lines. Use of commonly available gel-cell batteries charged with solar cells are preferred for equipment power for several reasons. One is the cost of running power circuits to the top of the mounting pole where the communications cabinet is mounted. A more serious reason is that the power circuits could invalidate the protection otherwise afforded against fault induced rise in substation ground potential.

Florida Power Corporation has kindly cooperated with the Beckwith Electric Company in beta site installations in order to obtain information on the Beckwith Electric Autodaptive™ volt/Var management system. In anticipation of use of wireless communications per the present invention, experiments were conducted on Jun. 15, 1999 at the Florida Power Corp. Gateway distribution substation located on 34th St. just south of Ulmerton Road in Pinellas County, Florida.

Two battery operated laptop computers were each connected to a digital spread spectrum wireless communications test board as described by References 4 and 5 hereinabove. One pair of boards operated at 2400 MHz and another at 900 MHZ. Identical tests were made at each frequency with one board and computer held at a fixed location outside the substation and the other at various points within the station. It was found that locations could be found where data communications at 2.4 GHz would fail. At 900 MHz communications at all places in the substation was possible. In an attempt to cause failure, the substation unit was held between a tapchanging transformer and a control cabinet located nearby. Even with the substation 'hidden' as best possible, digital data was properly transferred at 900 MHz between the two laptop computers. It is believed, however, that advanced technology, used at 2.4 GHz, meeting IEEE Standard 802.11 will more than overcome the apparent advantage of 900 MHz observed in this test.

Figure 1:
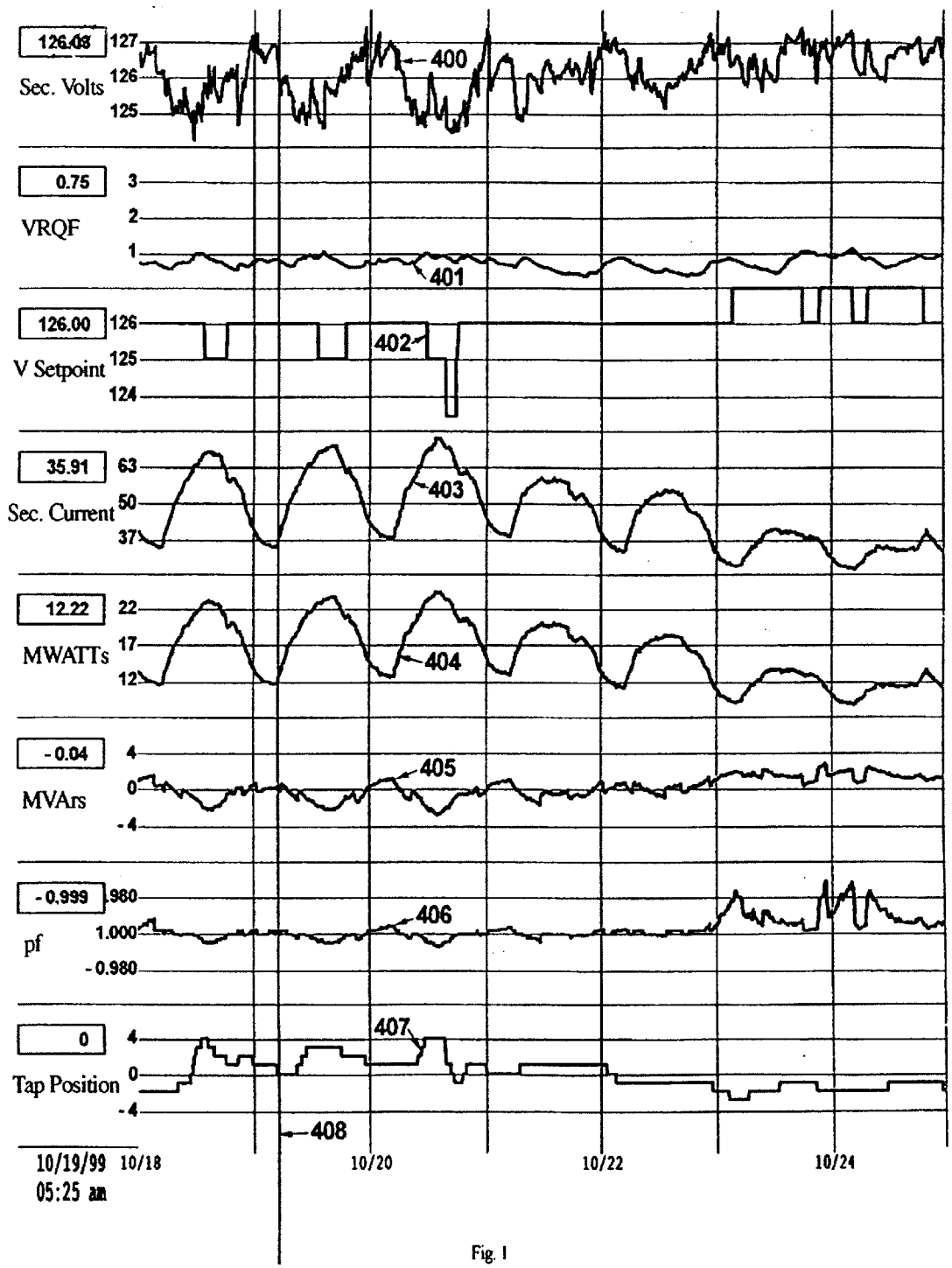
FIG. 1 shows a typical set of graphs and data available from M-2667 controls.

FIG. 1 shows a typical display of data taken from a Beckwith Electric M-2667 tapchanger in active control of a tapchanging transformer at the Florida Power Cross Bayou substation beta test site. The data was read and plotted at the nearby Beckwith Electric Company engineering laboratory by the Beckwith Electric Slimcom™ communications program. The circuit used consisted of a wire telephone line to a cell phone connected in pipeline fashion per the present invention to M-2667 IEDs at the substation.

In FIG. 1 the SEC. Volts graph 400 is the voltage averaged over 6 minute periods for the week starting Oct. 18, 1999 through Oct. 24, 1999. The VRQF graph 401 is the rms error in regulation of voltage about a set point of 126 Vac illustrating excellent voltage regulation obtained by an M-2667 tapchanger control. The V Setpoint graph 402 is the 126.00 volt setpoint with variation for Var bias as explained in U. S. Pat. No. 5,646,512, Referenced 13 hereinabove. This patent describes the lowering of the setpoint voltage to influence the switching "on" and raising of the setpoint voltage to influence switching "off" of Autodaptive™ capacitor controls. The Sec. Current graph 403 shows the AC load current on the phase of the transformer which the M-2667 control is sensing. This in on the secondary of a current transformer with 200 mA as rated full load. The MWATTs graph 404 is the megawatt loading on the transformer calculated as true megawatts. The MVArs graph 405 is the true megavar loading on the transformer illustrating proper operation of the Autodaptive™ volt/Var management system. The pf graph 406 shows the control of power factor by the Autodaptive™ volt/Var management system. The Tap Position graph 407 shows 37 tapchanges during the week required by the M-2667 tapchanger control to realize VRQF 401. The time and date showing Oct. 19, 1999, 05:25 am is the time of the solid line curser bar 408 useable by moving right and left by use of the Slimcom™ program to select precise data points for display in the rectangular boxes to the left of each graph.

A person trained in examining such graphs of data can determine when maintenance is required at switched power factor correction capacitor locations on the distribution lines fed by the substation. Maintenance crews can then respond only when repairs to the capacitor equipment are required. The personnel interested in such data are generally not those using SCADA to effect centralized control of substations. Data for FIG. 1 is available by selections of the wireless communications methods described herein.

FIG. 1 illustrates information available using laptop computers as the human interface for IEDs by means of the inventive wireless communications apparatus and methods as described herein.

Figure 2:
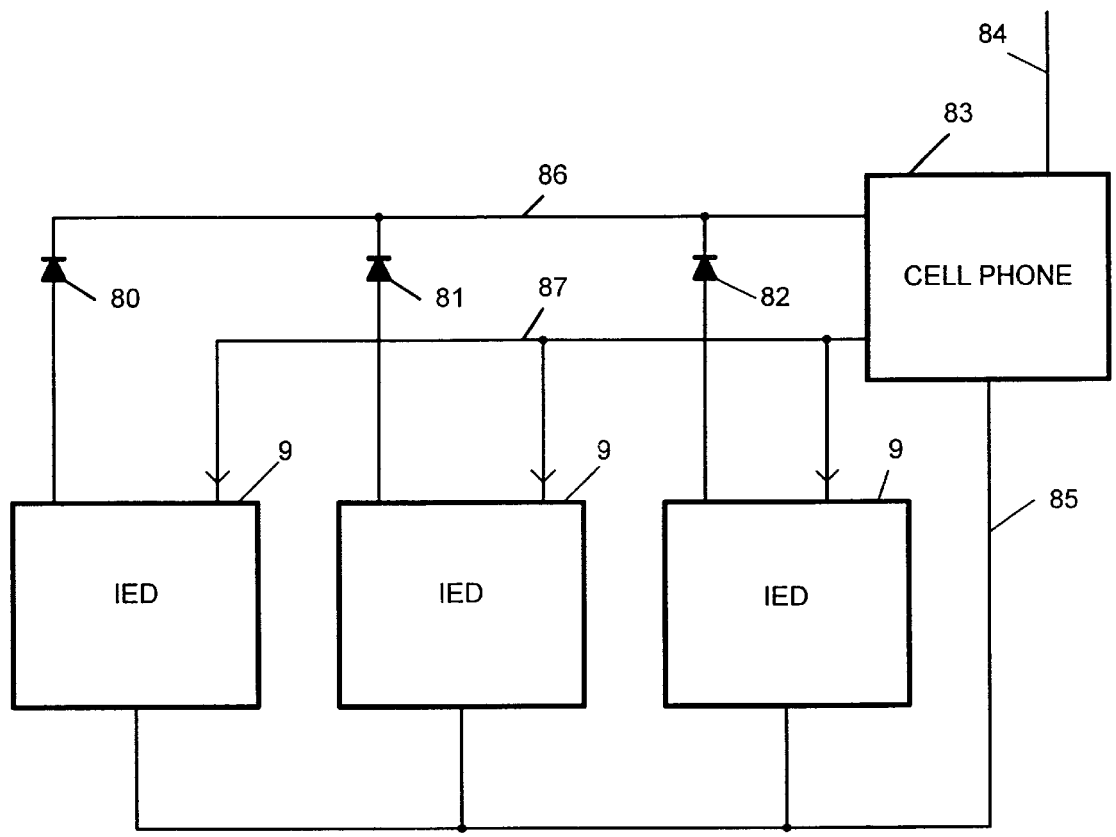
FIG. 2 illustrates a simplified pipeline[1] communications circuit for obtaining the data of FIG. 1.

FIG. 2 illustrates pipeline communications circuits used to communicate data from substations by cell phone. In FIG. 2 circuitry is used to parallel RS232 ports so as to obtain data from multiple IEDs 9. IEDs 9 communicate digital data through diodes 80, 81, and 82 via input conductor 86 to cell-phone modems in device 83. Device 83 further includes a cell phone with antenna 84 for external two-way communications from substations having IEDs 9. Return digital data from device 83 in fed to devices 9 by conductor 87. Circuit 85 provides a return path between device 83 and IEDs 9. This circuit is used with IEDs having no built in wireless communications circuitry.

FIG. 3a illustrates equipment racks 2 on which WTTs 8 are mounted and connected to telephone circuits 1 for outside data communications. Also mounted on racks 2 are six IEDs 9 numbered #1 through #6, each IED 9 having a wireless communications antenna 4. Said WTTs 8 have wireless communications antennas 4 used for communications to IEDs 9. Said WTTs 8 communicate with said IEDs 9 placing data on busses within WTTs 8 mimicking busses in said IEDs 9 so that said data can be exchanged with said IEDs 9 via telephone circuit 1 as if communicating directly with said IEDs 9. This arrangement is useful to combine IEDs having self-contained wireless communications circuitry.

FIG. 3b illustrates laptop computers 5 having wireless communication transceiver cards 6 plugged into receptacles not shown, said cards having antennas 3. Laptop computers 5 with wireless communication cards 6 are useable as the human interface for all six IEDs 9 in FIG. 3a and can be switched from one to another by programs contained within laptop computers 5.

The absence of communications wiring makes this wireless communications most convenient as well as providing the ultimate in safe voltage isolation from IEDs 9. In addition to the costs of installing the wiring, considerable savings are realized in the lack of need for communications wiring drawings and record keeping of wiring runs.

In a first selection of applications, IEDs have an asynchronous port always available to receive an 8 bit message providing selectivity among up to 255 IEDs in any substation sufficiently isolated from other substations. When a communications time slot arrives the called IED responds and data packets are exchanged. Note that if the communications is a scan from a common device, the device assumes that the called device is the one responding and no further IED identity is required. In other applications involving an ad hoc group of IEDs in peer-to-peer communications the identity of the others in the group still may not be required by the logic of the situation.

In a second selection of applications, where the other members of an ad hoc group must be identified, a 16 bit asynchronous port is provided with the first 8 bits being the address of the receiver and the second 8 bits being the address of the sender.

FIG. 3c illustrates wireless communication transceiver cards 6 of FIG. 3b in greater detail. Such a card, available from Sierra Wireless Co., is called AirCard 300 CDPD.

FIG. 4a illustrates typical outdoor equipment box 22 containing IEDs 9. Wireless communication antennas 4 are shown extended by 50 ohm impedance coaxial cables 23 to positions of choice out of the top or bottom of cabinets 22.

FIG. 4b illustrates WTTs 8 mounted in outdoor boxes 25. WTT 8 wireless communication antennas 4 are shown extended from the tops and alternately from the bottom of cabinets 25 as connected by coaxial cables 23 for communications with IEDs 9 mounted nearby. WTTs 8 are connected to telephone lines 1 for outside communications with substations having WTTs 8 and IEDs 9.

FIG. 4c illustrates devices for adding wireless communications capability to IEDs which do not have wireless communications capability but do have RS232 communications ports. Note that while RS232 data ports are used hereinabove as typical of digital data ports that RS485 and other standard ports may be used. DE-9 connector 97 (The most common for RS232 ports) is connected by circuits 503 to register devices 500 for sending and receiving data packets at rates convenient for the IEDs and over circuit 504 to chip sets 501. Chip sets 501, such as the Prism II set described in Reference 3 above, then exchange packets with other wireless communications devices serving IEDs, generally at higher data rates. Power supplies 502 supply direct current (DC) power to said devices over circuits 505. These may be the familiar "power cubes" suitable for plugging into a supply of alternating current AC power. Selectively they are DC power supplies at required voltages for wireless communications devices, generally from 3 to 5 Volts DC, for permanent connection to sources of power, either DC or AC.

FIG. 5 illustrates typical three phase distribution line regulator installations. These are used to re-regulate voltages on long distribution lines to correct for variations in voltage due to variations in customer loads. Three regulators 38, 39 and 40 are mounted on wooden platforms 37 supported by wooden poles 33 and 34. Each regulator has input power bushings 35 and output bushings 36 and are shown connected to input lines 41 and output lines 42. Each regulator is controlled by IEDs 9 in boxes 22 with wireless communications antennas 4 extended from said IEDs 9. Note that boxes 22 are shown mounted on the regulators for illustration whereas they are more often mounted at ground level for ease of servicing. FIG. 4a above gives more detail of these regulator control boxes 22. Three phases of incoming lines connect to bushings 35 of regulators 38, 39 and 40. Bushings 36 of regulators 38, 39 and 40 are connected to three phases of outgoing line 42. Telephone cable 30 is carried along regulator support platform 37. A telephone cable circuit terminator 31 is located in the cable 30. Selectively one telephone circuit 1 from terminator 31 feeds box 25 in which an WTT 8 is located. WTT 8 antenna 4 protrudes from the top of box 25. FIG. 4b above gives more detail of these boxes 25.

In FIG. 5 WTT 8 communicates with the three regulator controls IED 9, typically every 6 minutes, updating data busses mimicking data busses in IEDs 9 but also instantly on demand from IEDs 9 at time of tapchanges. Wireless communications circuits in IEDs 9 are capable of peer-to-peer communications. Moreover IEDs 9 are capable of keeping track of the tap positions of the regulators which they control. The following procedure is used to keep the three regulators closer to the same taps than prior art systems and therefore reduces the phase unbalance of voltages 42 leaving the site. When a first of the three IEDs 9 is ready to call for a raise or lower tap change, the tap position of the other two regulators is obtained by wireless communications. The following logic is then used to determine whether indeed a tap change will be made or whether to wait for one or both of the other two IEDs 9 to call for a tap change.

1: If one or both of the other regulators is on a higher tap, then inhibit a lower output.

2: If one or both of the other regulators is on a lower tap, then inhibit a raise output.

3: If the other regulators are on the same tap as the first, or if one is higher and the other is lower than the first regulator, then permit either a raise or a lower operation.

Note that this logic does not require the specific identity of the other two of three IEDs in a group.

The tap positions are determined by methods such as:

1) using commercially available tap position monitoring equipment capable of sending tap position information to said IEDs.

2) said IEDs obtaining tap positions using self contained methods.

FIG. 6 illustrates apparatus equivalent to that of FIG. 3b with the laptop computers 5 mounted in electric power maintenance vehicles 50 and having antennas 4 connected via coaxial cables 23 so as to mount in the windows 52 of vehicles 50. Use of vehicles 50 provides cost savings as compared with the prior art requirement to plug communications cables into RS232 ports of regulator controls.

FIG. 7a illustrates a prior art circuit using optically coupled voltage isolation of an RS232 communications port 97 for comparison in complexity with the inventive wireless communications port circuits illustrated in FIG. 7b. In FIG. 7a IED microprocessor 72 exchanges digital data with power-receiver/power-driver device 90 over outgoing lines 298 and incoming lines 299. Device 90 exchanges digital data with opto-couplers 92 over outgoing lines 300 and incoming lines 301. Device 94 is an RS232 driver receiver with power receiver and exchanges digital data with said opto-couplers 92 over outgoing lines 303 and incoming lines 302. Digital data is exchanged between said device 94 and RS232 socket 97 over outgoing lines 304 and incoming lines 305. Power is transferred from said device 90 to said device 94 through transformer 91 as rectified by diode 95 and filtered by capacitor 96.

FIG. 7b illustrates the circuitry required to provide wireless human interface communications to typical IEDs 9. Coaxial cable sockets 60 accept either antennas 4 upward or terminated coaxial cables 23 downward for mounting antennas 4 at locations other than directly off IEDs 9. Device 71 buffers data packets from IED 9 control microprocessors 72 as communicated over circuit 74. This buffering of data packets avoids the necessity of microcontrollers 72 and chip sets 64 operating synchronously. Circuits 75 and 76 exchange control information between chip sets 64 and device 71. This controls the exchange of digital data packets between devices 64 and 71 over circuit 77. Bidirectional wireless communications frequency signals are conducted between chip sets 64 and filters 62 by conductors 63 and on to antenna sockets 60 by conductors 61. Filters 62 are composed of printed circuitry traces and form filters to prevent the clock frequency from spread spectrum chips 64 from reaching antennas 4 and causing undesired radiation. Circuits 65 support chip sets 64 as required.

FIG. 8 is a view looking down into a substation 120 using regulators 112 to feed three outgoing power distribution lines 113, 114, and 115. Power to distribution substation 120 is provided by incoming subtransmission lines 100 to bus 101, both lines and bus shown in single line form for the three wires of three phase circuits and bus. Three phase lines 102, 103 and 104 are transformed down in voltage to distribution level by three transformers 111 through the three regulators 112 controlled by IED controls 9 to provide power to substation output distribution lines 113. In an similar way three phase lines 105, 106 and 107 supply distribution lines 114 and lines 108, 109 and 110 supply distribution lines 115. A total of nine wireless communications antennas 4 provide digital communications to the nine IEDs 9. WTT 116 provides digital communications to said nine IEDs 9 from outside substations 120.

FIG. 9 illustrates one form of WTT 116 of FIG. 8. Fence 200 encloses distribution substation 120 as shown on FIG. 8. WTT 116 is mounted on pole 201 and contained within metal box 202. Telephone line 114 of FIG. 8 is tied to pole 201 by screw eye 209 before entering box 202 and connecting to telephone modem 211. Selectively wired telephone lines 114 may be replaced by coaxial-cable lines or fiber-optic cable lines. Parabolic antenna reflectors 206 are mounted on face 210 of box 202 and pointed towards substation 120 so as to communicate with IEDs 9 located within substation 120. Antenna reflectors 206 are parabolic in shape in the vertical dimension and straight lines in the horizontal dimension. Antennas 214 are horizontal conductors an even number of half waves of the wireless communications frequency long. Reflector end plates 215 connect to ends of antennas 214. Wireless communications signals are supplied to antennas 206 by wireless communications transceivers 207. Antennas 206 are located at the foci of the parabolas thus reducing signal transmission away from substation 120 as well as protecting transceivers 207 from undesired signals from outside the substation 120. Computers 208 receives wireless communications data from IEDs 9 and places the data in memory busses 203 so as to mimic data busses within IEDs 9. Computer 208 communicates with SCADA systems over telephone line 114 using data from data busses 203. Computer 208 contains sufficient non-volatile memory to accommodate protocols as required by SCADA systems. Computer 208 utilizes microprocessor and other technology developed for use in laptop computers to conserve power requirements. Power for computer 208 and transceiver 207 is furnished by gel cells 209 in turn charged by solar cells 205 using technology well known for outdoor recreational equipment.

FIG. 10 illustrates an WTT 116 similar to that shown in FIG. 9 except that the telephone line 114 has been replaced by wireless phones 213 with modems 211 and using antennas 212 for distribution of IED 9 data to users of the data. Cell phones, satellite phones and direct Internet access telephones are selective choices of wireless phones 211. Selectively computers 208 are replaced by pipeline communications connections from transceiver 207 to wireless phones 211 and to end users of the digital information.

The basic topology of an IEEE 802.11 network is shown in FIG. 11a. A Basic Service Set (BSS) 593 in its simplest form consists of two or more wireless nodes, e.g., IEDs 590, 591, 592, which have recognized each other and have established communications. This situation has a special designation, namely the Independent BSS (IBSS). Within an IBSS, IEDs communicate directly with each other on a peer-to-peer level. This type of network is often formed on a temporary basis such as described in more detail herein for minimizing voltage unbalance when using three single phase regulators, one per phase of an outgoing line from a distribution substation.

Referring to FIG. 11b, a more flexible configuration is that of BSSs such as 594 and 595 which contain Access Points (APs) 602 and 603 these BSSs should be thought of as having more than the two nodes (IEDs) each (600,601 and 603,604) as illustrated. BSS-A 594 typically contains control and protection IEDs. BSS-B 595 typically contains metering devices. The main function of an AP is to form a bridge between wireless and wired Local Area Networks (LANs). When an AP places the BSS in an operating mode all IEDs communicate with the LAN. Events, such as tapchanger control IEDs about to make tapchanges, for example, can cause IEDs to switch briefly to the IBSS mode until the switch operation is complete. IEDs not involved with the IBSS mode continue to function with the AP in the operating mode.

The Extended Service Set (ESS) illustrated in FIG. 11b consists of a series of BSSs (each containing an AP and selectively convertible to an IBSS) connected together by means of a Distribution System (DS) 596. Although the DS could be any type of network (including a wireless network), it is invariably an Ethernet LAN. Within an ESS, IEDs can roam in communications path selections from one BSS to another and communicate with any mobile or fixed client in a manner which is completely transparent to the protocol stack above the Media (data) Access Control (MAC) sub-layer. Note in particular that the Ethernet technology reaches only to the AP and not to the IEDs.

This discussion of FIGS. 11a and 11b follows closely the discussion found in Reference 2 above which describes the operation obtained through the use of the PRISM II chip set described in Reference 3 above. This discussion is customized, however, so as to describe the inventive addition herein of peer-to-peer communications between IEDs in an ad hoc group to the invention of U. S. Pat. No. 5,943,202 TWO WAY PACKET RADIO INCLUDING SMART DATA BUFFER AND PACKET RATE CONVERSION, Reference 11 above.

FIG. 11b also shows a server 606 in wireless communications through the ESS to IEDs 600, 601 and others not shown. Server 606 is also in wireless communications with metering equipment contained in BSS-B 595. In present practice metering functions within a substation are seldom related to functions of control and protection provided by IEDs of BSS-A 594. Future plans are for meters to furnish voltage information for control and protection functions. Wireless communications will then have greater use between metering and control/protection IEDs. A single AP may then serve as a single data exchange device with information networks.

In further discussion of operations within BSS-A 594 a substation typically contains the following ad hoc groupings of IEDs:

A) Group 1 multiple groups of three regulator voltage control IEDs controlling the voltage and voltage balance of radial output power lines. Each group of three automatically forms an IBSS to exchange voltage information just prior to a tapchange and use this information to inventively maintain the voltage balance. The logic used by each IED is to permit only tapchanges that will reduce the voltage unbalance.

Selectively the tap positions are communicated among the three IEDs and the following logic used:

1) determining whether either or all other tap positions are higher than tap positions of regulators about to make tap changes.

2) blocking lower operations of tapchangers about to make tapchanges.

3) determining whether either or all other tap positions are lower than tap positions of regulators about to make tap changes.

4) blocking raise operations of tapchangers about to make tapchanges.

B) Group 2 tapchanger control IEDs used to parallel two and more load tapchanging transformers in which tap position is continually exchanged by peer-to-peer license-free wireless communications between said IEDs. The IEDs the block tapswitch operations which would result in more than one tap difference in tapswitch positions. Note again that each IED need not know the specific identity of other IEDs in the ad hoc group performing the paralleling.

A license-free wireless communications device is useable at tie breakers to communicate the breaker condition (open or closed) to the LTC transformer control IEDs in order for them to select parallel or independent control operation.

The tap positions are determined by methods such as:

1) using commercially available tap position monitoring equipment capable of sending tap position information to said IEDs.

2) providing tap position capability to said IEDs in accordance with keep track methods as found in U. S. Pat. No. 5,646,512 MULTIFUNCTION ADAPTIVE CONTROLS FOR TAPSWITCHES AND CAPACITORS. See Reference 13 hereinabove.

C) Group 3 IEDs including first bus differential protective relay IEDs capable of clearing faults on differences in power inputs from sources of inputs to load tapchanging transformers to output power to loads on said transformers. Said group further includes second tapchanger controls IEDs for said transformers capable of determining tap positions and communicating tap positions of said transformers to said first IEDs. The sensitivity of said differential protection by said first IEDs is thereby improved by the more accurate knowledge of effective transformer voltage reduction ratios. Tap positions are typically determined by said second IEDs using the methods of item B) just above.

Wireless communications are selectively provided from IEDs to AP A 602 as well as from metering devices to AP B 605. Data is communicated at very high rates to data busses in said APs permitting SCADA or other forms of communications to these data busses as if communicating directly with IEDs and meter devices. Note that SCADA communications to IEDs is not required providing cost savings and avoidance of problems of updating protocols in the IEDs.

ADVANTAGES OF THE INVENTION

A. Eliminating costs of communications cabling, wiring and record keeping.

B. Taking the high cost of protocol handling out of IEDs and placing the cost in a single device per substation for all compliant IEDs.

C. Providing memory space in WTT devices for easy updating of protocol programs as standards continue to change.

D. Providing access of IED data not restricted by protocol standardization.

E. Making possible the economical placing of IED data on the Internet making the data available both to the owner and to the manufacturer.

F. Providing peer-to-peer communications between control and protection devices within a substation for direct coordinating of functions without use of common apparatus.

G. Providing communications between three regulators so as to reduce three phase voltage unbalance.

H. Providing exchange of tap position for economical paralleling of transformers.

What is claimed is:

1. Digital communications devices for use at stations of an independent basic service set (IBSS) of intelligent electronic devices (IEDs) and a common access port (AP) to the IBSS comprising in combination:
   a) means for providing control and protection of electric power apparatus by use of said intelligent electronic devices (IEDs),
   b) wireless communications means for providing license-free two-way wireless peer to peer communications of digital data between pairs of said IEDs,
   c) said wireless communications means providing license-free two-way wireless peer to peer communications between ones of said IEDs and said common AP,
   d) said wireless communications means utilizing spread spectrum technology,
   e) said spread spectrum technology utilizing direct-sequence-spread-spectrum (DSSS) technology,
   f) three regulators controlling three-phase voltages,
   g) IED means for each of said regulators,
   h) keep track means for each of said three IEDs to each keep track of the tap position of the related regulator,
   i) each of said three IEDs utilizing said wireless communications means to exchange tap position information with the other two LEDs when a tapchange is about to be made,
   j) blocking means for any first IED to block any raise operation of said tapchange about to be made if either or both said exchanged tap positions are lower than the tap position of the regulator controlled by said first IED, and
   k) blocking means for any first IED to block any lower operation of said tapchange about to be made if either or both said exchanged tap positions are higher than the tap position of the regulator controlled by said first IED, whereby differences in regulator tap positions are minimized.

2. Digital communications devices for use at stations of an independent basic service set (IBSS) of intelligent electronic devices (IEDs) and a common access port (AP) to the IBSS comprising in combination:
   a) means for providing control and protection of electric power apparatus by use of said intelligent electronic devices (IEDs),
   b) wireless communications means for providing license-free two-way wireless peer to peer communications of digital data between pairs of said IEDs,
   c) said wireless communications means providing license-free two-way wireless peer to peer communications between ones of said IEDs and said common AP,
   d) said wireless communications means utilizing spread spectrum technology,
   e) said spread spectrum technology utilizing direct-sequence-spread-spectrum (DSSS) technology,
   f) connection means for connecting servers to said APs,
   g) server means for said server determining when back-up protective tripping of breakers is required,
   h) server means for said server tripping breakers when required,
   i) identification means for said server identifying IEDs as out of service due to failures to communicate, and
   j) contingency criteria means for said server using contingency criteria for circuit breaker tripping with said identified IEDs out of service,
   thereby providing back-up protection in the event of failed IEDs.

3. Digital communications devices for use at stations of an independent basic service set (IBSS) of intelligent electronic devices (IEDs) and a common access port (AP) to the IBSS comprising in combination:
   a) means for providing control and protection of electric power apparatus by use of said intelligent electronic devices (IEDs), b) wireless communications means for providing license-free two-way wireless peer to peer communications of digital data between pairs of said IEDs, c) said wireless communications means providing license-free two-way wireless peer to peer communications between ones of said IEDs and said common AP, d) said wireless communications means utilizing spread spectrum technology, e) said spread spectrum technology utilizing direct-sequence-spread-spectrum (DSSS) technology, f) antenna means for use with wireless communications means, g) reflector means for said antennae having a vertical parabolic shape, h) reflector means for said antennae having a straight horizontal shape, i) closing means for ends of said antenna reflectors, and j) said antennae means consisting of horizontal wires at the focus of said parabolas, whereby the antenna reflectors direct wireless energy away from the ground and sky.

4. Devices as in claim 3 further comprising in combination a) said means for said closed ends being an even integer number of half cycle periods of the wireless frequency apart, and b) connection means for connecting ends of said antennas to said closed ends for providing resonance of the antennae for greater effective power toward IEDs and reduced receiver sensitivity to signals from the back of the reflector.

5. Apparatus as in claim 4 further comprising a) mounting means for mounting said IEDs in substations, and b) mounting means for mounting said wireless communications devices off the ground in locations in which said IEDs are within a 180 degree horizontal range of said antennas whereby wireless power is effectively directed toward IEDs and interference from outside the substation is minimized.

6. Digital communications devices for use at stations of an independent basic service set (IBSS) of intelligent electronic devices (IEDs) and a common access port (AP) to the IBSS comprising in combination:

a) means for providing control and protection of electric power apparatus by use of said intelligent electronic devices (IEDs), b) wireless communications means for providing license-free two-way wireless peer to peer communications of digital data between pairs of said IEDs, c) said wireless communications means providing license-free two-way wireless peer to peer communications between ones of said IEDs and said common AP, d) said wireless communications means utilizing spread spectrum technology, e) said spread spectrum technology utilizing direct-sequence-spread-spectrum (DSSS) technology, f) controlling means for IEDs controlling LTC transformers connected in parallel, g) keep track means for IEDs finding tap positions of said LTC transformers, h) communication means for IEDs to exchange tap positions, and i) blocking means for IEDs blocking tapswitch operations capable of causing more than one tap difference in tap positions, whereby transformers are properly controlled when in parallel.

7. Devices as in claim 6 further comprising in combination:

a) detection means for determining open/close condition of transformer paralleling circuit breakers, b) wireless communication means for communicating said open/close condition to said IEDs, and c) switching means for said IED means switching between independent/parallel mode of LTC transformer control in response to said open/closed condition, assuring proper control action as transformers are required to alternate between independent and parallel operation.

* * * * *